United States Patent
Shinojima et al.

(10) Patent No.: US 7,713,168 B2
(45) Date of Patent: May 11, 2010

(54) CONTROL APPARATUS FOR SHIFT RANGE CHANGEOVER DEVICE

(75) Inventors: Masaaki Shinojima, Chiryu (JP);
Shigeru Kamio, Nagoya (JP);
Yoshinobu Nozaki, Anjo (JP); Atsushi Kamada, Nishikamo-gun (JP)

(73) Assignees: Denso Corporation, Kariya (JP);
Toyota Jidosha Kabushiki Kaisha, Toyota (JP)

( * ) Notice: Subject to any disclaimer, the term of this patent is extended or adjusted under 35 U.S.C. 154(b) by 364 days.

(21) Appl. No.: 12/000,719

(22) Filed: Dec. 17, 2007

(65) Prior Publication Data

US 2008/0182717 A1 Jul. 31, 2008

(30) Foreign Application Priority Data

Jan. 30, 2007 (JP) ............................. 2007-020204

(51) Int. Cl.
*B60W 10/04* (2006.01)

(52) U.S. Cl. ..................................................... 477/111
(58) Field of Classification Search ..................... None
See application file for complete search history.

(56) References Cited

U.S. PATENT DOCUMENTS

| 7,084,597 | B2 | 8/2006 | Nakai et al. |
| 7,161,314 | B2 | 1/2007 | Nakai et al. |
| 2004/0008002 | A1 | 1/2004 | Kamio et al. |

FOREIGN PATENT DOCUMENTS

JP 2004-125061 4/2004

*Primary Examiner*—Dirk Wright
(74) *Attorney, Agent, or Firm*—Nixon & Vanderhye PC

(57) ABSTRACT

A control apparatus for a range changeover device checks whether an actual range agrees with a target range. If the actual range differs from the target range, the control apparatus performs vehicle driving force restriction control irrespective of a presence/absence of abnormality in a range changeover operation. The control apparatus may restrict an engine output power by closing a throttle valve of the engine to around an idle position, thereby restricting the vehicle driving force.

3 Claims, 2 Drawing Sheets

CONTROL APPARATUS FOR SHIFT RANGE CHANGEOVER DEVICE

CROSS REFERENCE TO RELATED APPLICATION

This application is based on and incorporates herein by reference Japanese Patent Application No. 2007-20204 filed on Jan. 30, 2007.

FIELD OF THE INVENTION

The present invention relates to a control apparatus for a shift range changeover device that controls an electric actuator such as an electric motor to change over gear shift ranges in response to a shift range changeover operation of a driver.

BACKGROUND OF THE INVENTION

Vehicles are controlled electronically more and more in recent years. For example, in JP 2004-125061A, a gear shift range changeover operation by a gearshift lever of an automatic transmission is detected by a switch, etc. Based on the detection signal, an electric actuator such as an electric motor is controlled so that a range of a shift range changeover device is changed over to a target range selected or instructed by a driver of a vehicle. This is a shift-by-wire range changeover control system.

Furthermore, in JP 2004-125061A, abnormal operation of a vehicle is prevented at the time of failure of the automatic transmission. That is, an actual shift range of the automatic transmission is detected and the detected range is compared with the target range selected by the driver. The presence/absence of abnormality of the automatic transmission is determined based on whether the detected actual range agrees with the target range. When abnormality is determined, a driving power transfer system from the engine side to the driving wheel side is interrupted, so that the output power of the engine is not transmitted to the driving wheel.

The shift range is changed over to the target range, after the driver makes a target range changeover operation and the motor is driven to effect the changeover. As a result, a range changeover delay is caused in correspondence to a motor drive time from an instruction of the changeover of the target range to a completion of an actual changeover. Therefore, it becomes necessary not to determine the presence/absence of abnormality for a predetermined wait period after the target range is changed over. This predetermined wait period is set longer than a changeover operation delay period in the range changeover device. The presence/absence of abnormality in the automatic transmission is thus determined after the predetermined wait period elapses by checking whether the actual range is the same as the target range.

In such abnormality determination, a detection delay is caused until the abnormality is detected after the target range is changed over. This detection delay corresponds to at least a range changeover operation delay time. Therefore, it is impossible to restrict the vehicle from abnormal operation during the abnormality detection delay, when the abnormality actually arises.

Even when the range changeover device operates normally according to a changeover in the target range, an accelerator pedal is sometimes pressed down for engine acceleration before the range changeover to the target range is completed. In this instance, with the previous range before the range changeover, that is, a range which the driver does not want any more, the engine output power may increase and vehicle driving force may increase. Thus, it is likely that the vehicle operates abnormally, although the driver does not expect such an operation.

SUMMARY OF THE INVENTION

It is therefore an object of the present invention to provide a control apparatus for a shift range changeover device, that restricts abnormal operation of a vehicle before a completion of a shift range changeover irrespective of a present/absence of abnormality in a shift range changeover operation.

According to one aspect, a control apparatus is provided for a range changeover device, which includes an electric actuator as a drive source an changes over shift ranges of an automatic transmission. The control apparatus has a range input device, a changeover control device, a range detection device and a driving force restriction device. The range input device inputs a target shift range selected by a driver. The changeover control device controls the electric actuator in response to the target range to change a range of the range changeover device to the target range. A range detection device detects the actual range of the range changeover device. The driving force restriction device performs driving force restriction control to restrict a vehicle driving force until the actual range comes to agree with the target range irrespective of a presence/absence of abnormality in a range changeover operation, when the actual range is different from the target range.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
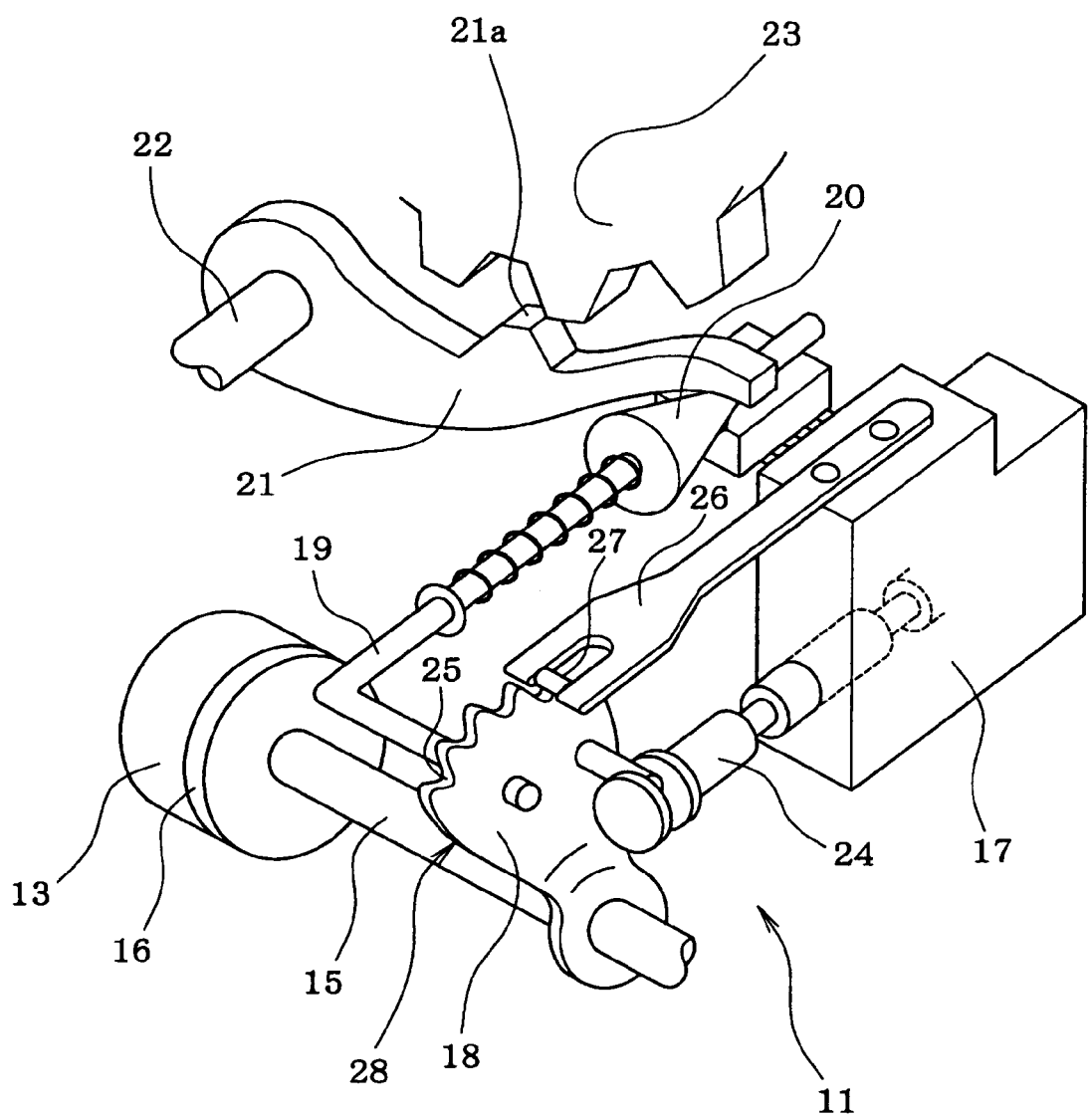
FIG. 1 is a perspective view of a shift range changeover device, which is controlled by a control apparatus according to one embodiment of the present invention.

Referring first to FIG. 1, a shift range changeover device 11 is provided in an automatic transmission 12 of a vehicle. The changeover device 11 is for changing over a gear shift range of the automatic transmission 12 to, for example, a parking range (P), a reverse range (R), a neutral range (N) or a drive range (D). The range may be defined as a gear shift position. An electric motor 13 that is a driving source of the range changeover device 11 is configured by, for example, a synchronous motor such as a switched reluctance motor (SR motor), and has a reduction mechanism 14 (FIG. 2) incorporated thereinto. An output shaft sensor 16 that detects the rotational position of an output shaft 15 which is coupled with the rotational shaft of the reduction mechanism 14 is disposed at the rotational shaft of the reduction mechanism 14. The output shaft sensor 16 is configured by a switch having four contacts which turn on in a rotational angle range corresponding to the respective shift ranges of P, R, N and D. The output shaft sensor 16 determines which contact is in an on-state, to thereby detect the present or actual shift range (output shaft rotational position).

The output shaft 15 is fixed with a detent lever 18 for changing over a manual valve 17 of a hydraulic circuit of the automatic transmission 12. The detent lever 18 is fixed with an L-shaped parking rod 19, and a conical body 20 that is disposed at the leading section of the parking rod 19 is abutted against the lock lever 21. The lock lever 21 is so designed as to vertically move while being centered on the shaft 22 according to the position of the conical body 20 to lock or unlock the parking gear 23. The parking gear 23 is disposed on the output shaft of the automatic transmission 12. When the parking gear 23 is locked by the lock lever 21, the driving wheels of a vehicle are held in a stop state (parking state).

Also, the detent lever 18 is coupled with a spool valve 24 of the manual valve 17. The detent lever 18 is rotated integrally with the output shaft 15 by the aid of the motor 13 to change over the position of the spool valve 24 of the manual valve 17 in such a manner that the hydraulic clutch which is built in the automatic transmission 12 is changed over to any state of the P-range, the R-range, the N-range, and the D-range.

The detent lever 18 is formed with five retentive recesses 25 for retaining the detent lever 18 to positions corresponding to the respective ranges. A leaf detent spring 26 for retaining the detent lever 18 to positions corresponding to the respective ranges is fixed to the manual valve 17. An engagement section 27 that is disposed on a leading end of the detent spring 26 is fitted into the retentive recesses 25 of a target range of the detent lever 18. As a result, the detent lever 15 is retained at the rotating position of the target range, and the position of the spool valve 24 of the manual valve 17 is retained at the position of the target range. The detent mechanism 28 is constituted by the detent lever 18, the detent spring 26 and the like.

In the P-range, the parking rod 19 is moved in a direction of approaching the lock lever 21. A thicker portion of the conical body 20 pushes up the lock lever 21, a convex (projection) 21a of the lock lever 21 is fitted into the parking gear 23 to lock the parking gear 23. With the above operation, the output shaft (driving wheels) of the automatic transmission 12 is held in the locked state (parking state).

In the ranges other than the P-range, the parking rod 19 moves away from the lock lever 21, and the thicker portion of the conical body 20 exits from the lock lever 21, and the lock lever 21 moves down. With the above operation, the convex 21a of the lock lever 21 is disengaged from the parking gear 20 to cancel the lock of the parking gear 20, and the output shaft of the automatic transmission 12 is held in a rotatable state (travelable state).

Figure 2:
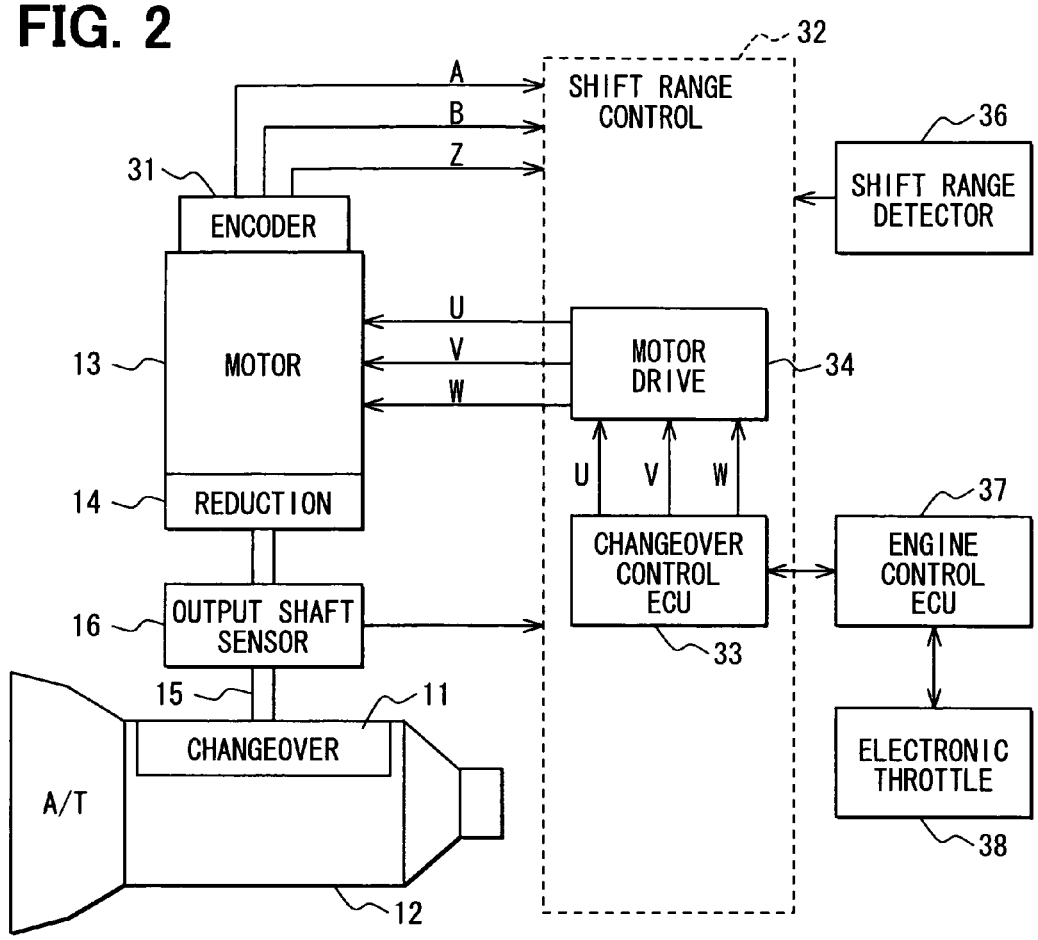
FIG. 2 is a block diagram of the control apparatus for the range changeover device shown in FIG. 1.

As shown in FIG. 2, the motor 13 is equipped with an encoder 31 for detecting the rotational position of a rotor. The encoder 31 is constituted by, for example, a magnetic rotary encoder. The encoder 31 is so designed as to output pulse signals of an A-phase, a B-phase, and a Z-phase to a shift range changeover control device 32 in synchronism with the rotation of the rotor of the motor 13. A shift range changeover control ECU 33 counts both of the leading edge and the trailing edge of the A-phase signal and the B-phase signal which are output from the encoder 31. The ECU 33 then changes over the energizing phase of the motor 13 in a given order by means of the motor driving circuit 34 according to the encoder count value, to thereby rotationally drive the motor 13.

In this situation, the ECU 33 determines the rotating direction of the rotor according to the occurrence order of the A-phase signal and the B-phase signal. In the positive rotating direction (the rotating direction from the P-range to the D-range), the encoder count value is counted up. In the negative rotating direction (the rotating direction from the D-range to the P-range), the encoder count value is counted down. With the above operation, even if the motor 13 rotates in any direction of the positive rotation or the negative rotation, a correspondence relationship between the encoder count value and the rotational position of the motor 13 is maintained. For this reason, in any rotating direction of the positive rotation and the negative rotation, it is possible to detect the rotational position of the motor 13 by the encoder count value to energize a coil winding of a phase corresponding to the rotational position to rotationally drive the motor 13. The Z-phase signal of the encoder 31 is used to detect the reference rotational position of the rotor.

The output shaft sensor 16 is used as a shift range detecting means for detecting the actual range of the range changeover device 11. It is possible to detect the actual range by using the count value of the encoder 31 in place of the output shaft sensor 16. That is, the encoder 31 may be used as the shift range detecting means.

When a shift lever (not shown) of the automatic transmission 12 is operated by a driver, a range detection device (range input means) 36 detects the position of the shift lever, that is, a shift range selected by the driver as the target range. The output signal of the range detection device 36 is inputted as a target range signal to the range changeover control ECU 33. The range changeover control ECU 33 sets a target rotational angle (a target count value of the encoder) corresponding to the target range, and starts to supply current to the motor 13. The motor 13 is feedback-controlled to stop at a position, which corresponds to the target count value of the encoder.

After the target range is changed over by the range changeover operation of the driver, the motor 13 is driven to rotate so that the actual range is changed over to the target range. As a result, a range changeover delay corresponding to a drive period of the motor 13 is caused from the changeover operation of the target range to the completion of actual changeover to the target range. Therefore no determination is made during a predetermined wait period, which is set to be longer than the changeover delay period starting from the changeover operation of the target range. After this wait period, the presence/absence of abnormality in the range changeover operation is determined based on whether the actual range is the same as the target range. Thus a detection delay, which corresponds to at least the range changeover delay time, is necessarily caused until abnormality in the range changeover operation is detected after the changeover operation of the target range.

When any abnormality actually arises, it is impossible to prevent a vehicle from operating abnormally during the detection delay period until the abnormality is detected. Even when the shift range changeover device 11 operates normally in response to the changeover operation of the target range, it may often occur that an accelerator pedal is pressed down for acceleration before the range is actually changed to the target shift range. In this instance, the engine output power and hence a vehicle driving force will increase in such a shift range, which is not the instructed target range and not intended by the driver. Thus it is likely that the vehicle will operate abnormally in opposition to the expectation of the driver.

Therefore, it is monitored during operation of the engine whether the actual range detected based on the output signal of the output shaft sensor 16 is the same as the target range. If the actual range is different from the target range, the vehicle driving force restricted by the vehicle driving force restriction control until the actual range becomes the same as the target shift range irrespective of the presence/absence of abnormality in the range switching operation. Thus, whether the changeover operation is abnormal or not, the vehicle is controlled not to operate abnormally until the target range is attained.

The vehicle driving force restriction control may restrict the vehicle driving force within the automatic transmission 12 by, for example, weakening the engaging force of frictional engagement members such as clutches inside the automatic transmission 12. Alternatively, the vehicle driving force may be restricted by restricting output of the engine, which is a driving force of a vehicle, in the vehicle driving force restriction control. In restricting the engine output, for instance, a throttle valve may be restricted from being opened or the throttle valve may be controlled in the closing direction forcibly. Further, the ignition time points may be retarded or fuel supply to some of engine cylinders may be cut off to operate the engine with reduced number of combustions.

More than two of the above restriction control examples may be combined in the vehicle driving force restriction control. By restricting the engine output power as above, the vehicle driving force can be surely restricted.

Figure 3:
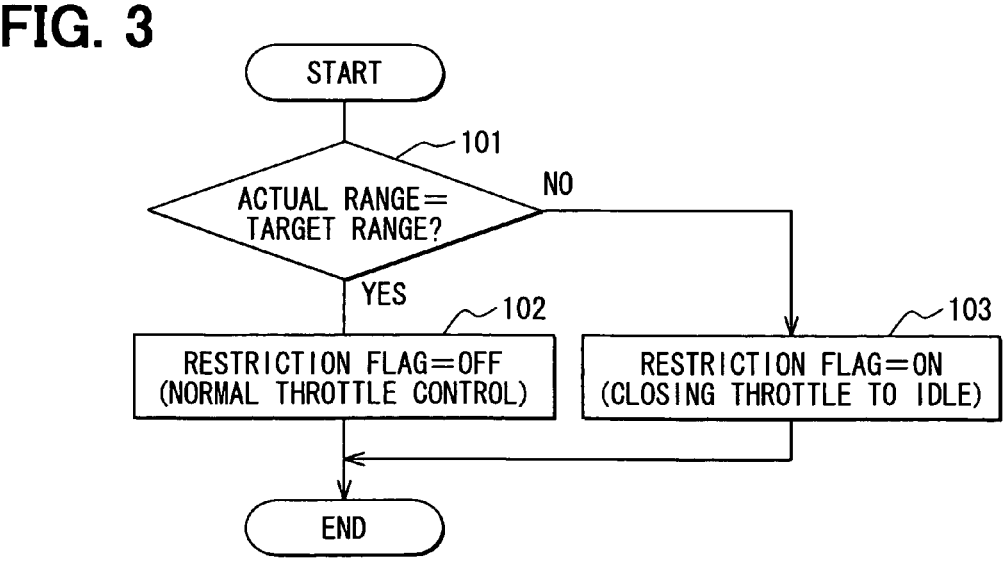
FIG. 3 is a flowchart of a shift range monitoring process executed by the control apparatus shown in FIG. 2.

According to this embodiment, the range changeover control ECU 33 or an engine control ECU 37 is provided as a control means and programmed to execute a range monitoring routine shown in FIG. 3 at a predetermined interval during engine operation.

Specifically, it is checked at step 101 whether the actual range detected based on the output signal of the output shaft 16 during the engine operation agrees with the target range. If the actual range is in agreement with the target range, a driving force restriction control flag is turned off at step 102 not to execute the vehicle driving force restriction control. In this case, no driving force restriction is performed. An air suction system (electronic throttle system 38), an ignition system and a fuel system are controlled normally to produce a vehicle driving force in correspondence to an accelerator operation of the driver and engine operation conditions.

If the actual range is different from the target range, the vehicle driving force restriction control flag is turned on at step 103 to execute the driving force restriction control irrespective of the presence/absence of the range changeover operation. In this case, for instance, the engine control ECU 37 sets a target throttle position to around an idle position for engine idling operation, and an electronic throttle system 38 responsively closes the throttle valve toward the idle position.

With this control, the engine output power can be surely reduced to a minimum output power level required to maintain the idle operation of the engine and prevent the engine from stalling in the course of the vehicle driving force restriction control. As a result, the vehicle is surely restricted from operating abnormally.

As described above, if the actual range is different from the target range, the vehicle driving force restriction control is performed until the range is actually changed over to the target range, whether any abnormality in the range changeover operation is present or not. If any abnormality actually arises in the range changeover operation, the vehicle can be controlled not to cause abnormal operation by the vehicle driving force restriction control even before the abnormality in the range changeover operation is detected.

The accelerator may be pressed down to accelerate the engine before the range is actually changed over to the target shift range under a condition that the range changeover device 11 is operating normally in response to the changeover operation of the target range. Even in this case, the vehicle can be controlled not to cause abnormal operation by the vehicle driving force restriction control.

Thus, irrespective of the presence/absence of abnormality in the range changeover operation, the vehicle can be controlled not to produce any abnormal operation until the range is actually changed over to the target range.

In the range changeover device shown in FIG. 1, four ranges of P, R, N, D of the automatic transmission 12 are changed over by a rotational movement of the detent lever 18. It is also possible to change over among five or more ranges or change over between only two ranges, which are P-range and the other range (non-P range).

In a transmission system having a plurality of forward drive ranges (e.g., L-range, 2nd-range in addition to D-range), both the actual range and the target range may be in the forward drive range. In this instance, even if the actual range and the target range are different from each other, the vehicle driving forces are in the same direction. Therefore it is less likely that the abnormal operation of the vehicle becomes noticeable. Therefore, no vehicle driving force restriction control will be necessitated, if the actual range and the target range are both drive ranges for driving the vehicle in the forward direction.

It will suffice that the vehicle driving force restriction control is performed irrespective of the presence/absence of abnormality in the range changeover operation until the actual range comes to agree with the target range only in the following situations:

changeover between the non-drive range (P or N) and the drive range (D);

change over between the non-drive range (P, N) and the reverse range (R); and changeover between the drive range (D) and the reverse range (R).

The range selected by the shift lever and detected by the range detector 36 may be selected by a driver by any operation members other than the shift lever. The above embodiment may be implemented in many other ways such as by modifying the structure of the range changeover device 11.

What is claimed is:

1. A control apparatus for a range changeover device, which includes an electric actuator as a drive source to change over shift ranges, the apparatus comprising:
   a range input means that inputs a target shift range selected by a driver;
   a changeover control means that controls the electric actuator in response to the target range to change a range of the range changeover device to the target range;
   a range detection means that detects the actual range of the range changeover device; and
   a driving force restriction means that performs driving force restriction control to restrict a vehicle driving force until the actual range comes to agree with the target range irrespective of a presence/absence of abnormality in a range changeover operation, when the actual range is different from the target range.

2. The control apparatus according to claim 1, wherein the driving force restriction means restricts the vehicle driving force by restricting an output power of an engine, which drives the vehicle, during execution of the vehicle driving force restriction control.

3. The control apparatus according to claim 1, wherein the driving force restriction means restricts the vehicle driving force by restricting a throttle valve position to around a position of idling an engine during execution of the vehicle driving force restriction control.

* * * * *